(12) United States Patent
Seetharam et al.

(10) Patent No.: US 8,082,411 B1
(45) Date of Patent: Dec. 20, 2011

(54) METHOD AND SYSTEM FOR LOGICAL UNIT SUBSTITUTION

(75) Inventors: Adarsh Seetharam, San Jose, CA (US);
David W. Minnich, Hillsborough, NC (US); Rithin Shetty, Mountain View, CA (US); Amol Chitre, Sunnyvale, CA (US); Guillermo Roa, Raleigh, NC (US); David B. Bolen, Durham, NC (US)

(73) Assignee: NetApp, Inc., Sunnyvale, CA (US)

( * ) Notice: Subject to any disclaimer, the term of this patent is extended or adjusted under 35 U.S.C. 154(b) by 850 days.

(21) Appl. No.: 12/112,997

(22) Filed: Apr. 30, 2008

(51) Int. Cl.
*G06F 12/00* (2006.01)
*G06F 13/00* (2006.01)
*G06F 13/28* (2006.01)
*G06F 15/173* (2006.01)
*G06F 11/00* (2006.01)

(52) U.S. Cl. ............. 711/165; 711/162; 711/E12.001; 709/225; 709/239; 714/4.12; 714/6.32

(58) Field of Classification Search ............. 711/162, 711/165, E12.001; 709/225, 239; 714/5, 714/6, 4.12, 6.32
See application file for complete search history.

(56) References Cited

U.S. PATENT DOCUMENTS

| | | | | | |
|---|---|---|---|---|---|
| 6,061,761 | A | * | 5/2000 | Bachmat | 711/114 |
| 6,101,497 | A | * | 8/2000 | Ofek | 707/657 |
| 6,675,274 | B1 | * | 1/2004 | Lam et al. | 711/170 |
| 7,613,806 | B2 | * | 11/2009 | Wright et al. | 709/225 |
| 2003/0065780 | A1 | * | 4/2003 | Maurer et al. | 709/225 |
| 2005/0216591 | A1 | * | 9/2005 | Sato | 709/226 |
| 2006/0271758 | A1 | * | 11/2006 | Innan et al. | 711/170 |

OTHER PUBLICATIONS

"A Virtual Operating System", Dennis E. Hall, Deborah K. Scherrer, Joseph S. Sventek, Communications of the ACM vol. 23 Issue 9, Sep. 1980, p. 495-502.*

* cited by examiner

*Primary Examiner* — Michael Alsip
(74) *Attorney, Agent, or Firm* — Perkins Coie LLP

(57) ABSTRACT

Techniques introduced here swap logical unit meta-data of a logical unit without offlining the logical unit. In accordance with the techniques, a connection between a network storage controller and a host for the logical unit is maintained while meta-data of the logical unit are swapped with another logical unit available to the network storage controller. The swapping substitutes one logical unit for another without disconnecting the host. Advantageously, the host is not required to perform operations to re-establish a connection. Various software and hardware units can implement the techniques described herein.

11 Claims, 8 Drawing Sheets

300 ⟶

METHOD AND SYSTEM FOR LOGICAL UNIT SUBSTITUTION

BACKGROUND

A network storage controller is a system device which controls storage and retrieval of data on a network. An example of a network storage controller is a storage server, which is a processing system that stores and retrieves data on behalf of one of more clients on a network. The network storage controller includes an operating system that can store and retrieve data as blocks on a disk or other storage device. The operating system can alternatively store and retrieve the data as logical files from the disk or other storage device.

A network storage controller sometimes manages data in a group of non-volatile mass storage devices such as magnetic or optical disks. Such mass storage devices may be organized into groups of drives, such as into a redundant array of independent disks (RAID). A network storage controller typically includes memory for buffering data to be read from and written to and from the mass storage system. Typical network storage controllers implement the buffer as dynamic random access memory (DRAM).

The non-volatile mass storage devices may be aggregated and divided into volumes including logical units, each identified by a logical unit number (LUN). One or more hosts (e.g., clients) may access the logical units via a network, such as by mapping to the logical units and reading from and writing to the logical units as virtual mass storage devices. Data is stored to and retrieved from the logical units by the hosts as though the logical units were locally attached to the hosts as mass storage devices.

Typically, a logical unit is mapped to a host initiator using a protocol such as Fibre Channel Protocol (FCP) or internet Small Computer System Interface (iSCSI). Mapping can be accomplished by using an initiator group "igroup" which is a data structure used to associate a host's iSCSI Qualified Name (IQN) with a logical unit so that the host can access the logical unit. When the host establishes a connection to the network storage controller, the network storage controller searches the igroup for the host to see whether the host has access to the logical units. If so, the network storage controller allows the host to use the logical units identified by the igroup.

At times a logical unit requires maintenance, e.g. copying, restoring data, or checking data integrity. Traditionally performing maintenance on a logical unit required off-lining the logical unit, performing maintenance on the logical unit, on-lining the logical unit, and re-configuring the host to use the logical unit. A host mapped to a logical unit will often lose connectivity completely, negatively impacting the host by requiring set-up when the logical unit is back online. In particular, Windows hosts will often establish a different drive letter (E:, H:, J:) for a logical unit once the logical unit is back online. Further, performing maintenance on numerous logical units can be very time consuming and laborious.

Additionally, logical units are sometimes used by virtual operating systems. In virtualization, a virtualized operating system in a virtual environment typically does not allow the mapping of logical units not previously mapped at startup of the virtualized operating system. This creates difficulty in performing host side maintenance; a user is unable to add a logical unit or change the mapping of a logical unit. To perform maintenance, the virtual operating system would have to be shut down in order to connect logical units or change logical units connected to the virtual operating system.

DETAILED DESCRIPTION

Figure 1:
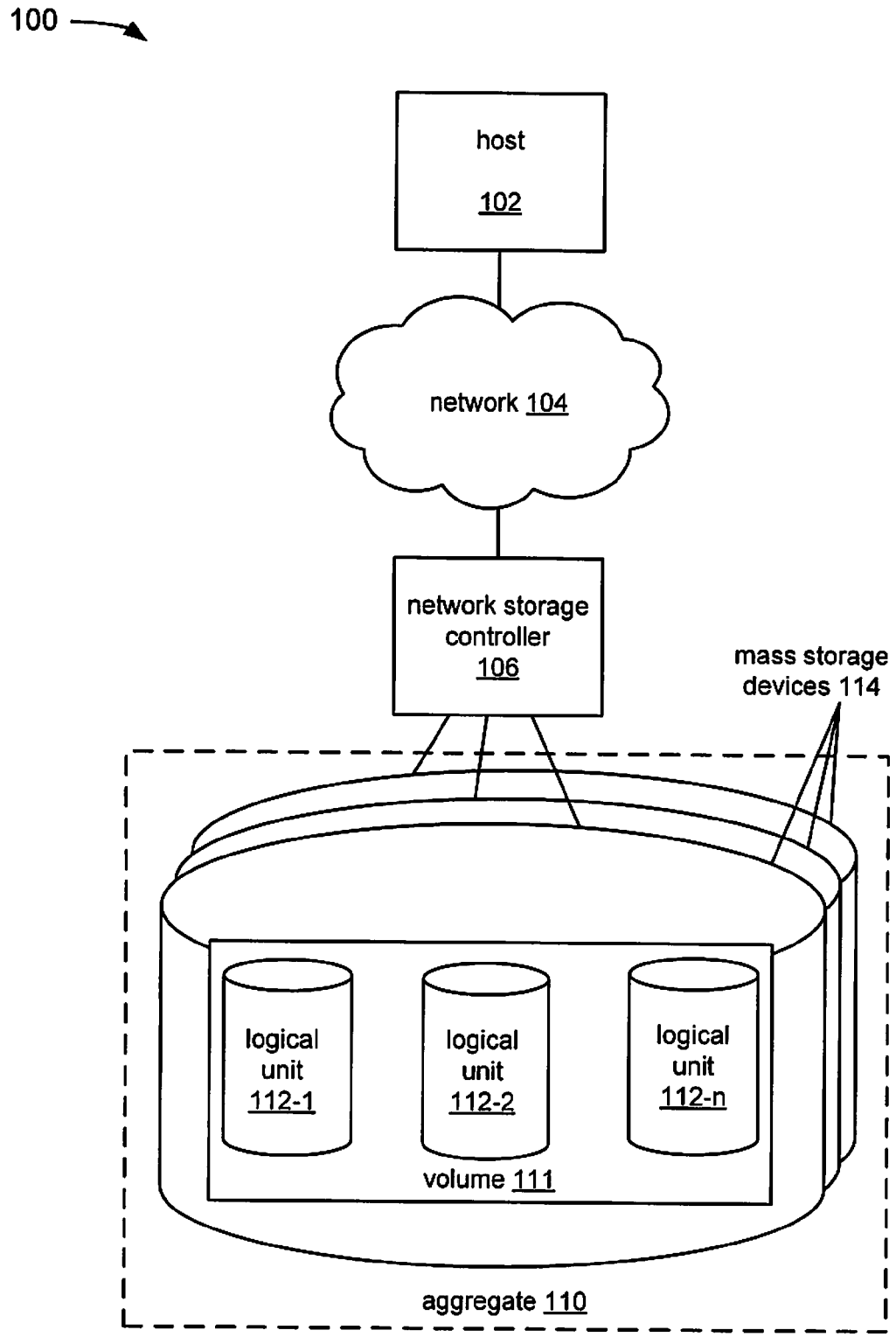
FIG. 1 depicts an example of a network storage system.

To overcome the problems discussed above, the techniques introduced here swap logical unit meta-data of a logical unit without disconnecting the host from the logical unit. A host is re-directed from a first logical unit to a second logical unit. To the host, the second logical unit is substituted for the first logical unit transparently. Advantageously, the host is neither disconnected, nor required to perform operations to re-establish a connection. In accordance with the technique, a connection between a network storage controller and a host for the logical unit is maintained while meta-data of the logical unit are swapped with another logical unit available to the network storage controller. Various software and hardware units can implement the techniques described herein.

In a method applying the technique, meta-data of an original logical unit is swapped with the meta-data of a dummy logical unit. By swapping the meta-data, the host is connected to the dummy logical unit and the original logical unit is freed for other actions or operations. The original logical unit can have data restored, integrity tests run, and have any other known or convenient action performed.

As used herein, a "dummy logical unit" or a "dummy" is a logical unit having meta-data, but storing no files or user data. The dummy logical unit cannot be written to or read from, but can serve to maintain an existing connection. Any data requests sent to a dummy logical unit will receive input/output (I/O) errors in response. The host can be instructed to refrain from reading or writing data to prevent the host from receiving the I/O errors so as to prevent the host from "timing out," or terminating a connection in response to receiving the I/O errors.

As used herein, "meta-data," or "logical unit meta-data," include information in reference to a logical unit such as, a unique identifier for the logical unit, hosts mapped to a logical unit, a size of the logical unit, whether the logical unit is online or offline, a type of the logical unit, e.g. Solaris®, Linux®, Windows®, and may include other parameters defining the logical unit.

As used herein, a "snapshot" is a persistent point-in-time image of data in a file system. The file system can be a live system, that is to say, the file system can be in active use when the snapshot is taken. The snapshot typically is a read-only copy of data frozen at a point in time, however, the snapshot can be created to allow both read and write access.

In a method applying the technique an original logical unit is cloned to produce a logical unit clone. A "logical unit clone" includes a copy of user data of an original logical unit and different meta-data. In a single volume a clone can be implemented by using pointers to the data so as to avoid reproducing the data. However, where the logical unit clone is in a different volume from the original logical unit, the data is copied to the different volume. The clone's meta-data separately identifies the clone from the original and can be swapped with the original's meta-data to redirect the host to the clone. The user now has two logical units and the host is connected to the logical unit clone without having been taken offline. This method can be used to implement a copy operation for the original logical unit, whereas the previous approach discussed above would require disconnecting the host from the network storage controller prior to making the copy. In addition, by deleting the original logical unit and keeping the logical unit clone, to which the host is connected, a move operation can be implemented.

In a system implementing the techniques, a logical unit meta-data swapping module can operate in conjunction with a temporary meta-data storage to copy meta-data of a first logical unit to the temporary meta-data storage, replace meta-data of the first logical unit with meta-data of a second logical unit, and replace meta-data of the second logical unit with the meta-data stored in the temporary meta-data storage.

In an implementation of the techniques introduced here, operation within a virtualized operating system in a virtual execution environment is made possible. Previously, a virtual execution environment would have to be shut down, reconfigured, and restarted to allow for use of an additional logical unit, because such a virtual execution environment would not allow for drives to be created or connected "on the fly." However, in accordance with the technique introduced here, a virtual operating system is executed to create a plurality of dummy logical units at a network storage controller. The dummy logical units cannot read or write data, but can satisfy the minimal requirements for a connection to a logical unit. However, where the dummy is created as a logical unit clone having data, reads can be allowed. When the host requires access to a logical unit on the network storage controller, meta-data of a dummy logical unit can be swapped with meta-data of a logical unit storing data. The virtualized operating system in the virtual environment is then able to access the data via the logical unit substituted for the dummy. Advantageously, the host need not be shut down and brought back online.

Additionally, at times while logical units are undergoing maintenance actions or have otherwise had their meta data swapped, power can fail, or another supervening problem can cause a storage system to fail. In the intermediate time, the state of the dummy logical units can remain unchanged. Hosts can remain connected to the dummy logical units indefinitely. After recovery from the failure, a system based on the techniques disclosed herein, can resume performing actions on logical units at the last swapped logical unit.

In an example, eighty logical units are to have maintenance actions performed on them. Twenty have had meta-data swapped when the power fails. When the power is restored, the storage system can resume where it left off with the remaining sixty logical units. Advantageously, the hosts connected to the logical units are not disconnected, although they are unable to read or write data while they are connected to the dummy logical units.

In a second example, an administrator could intentionally halt a process of restoring logical units at any point and resume at a later time. For example, the meta-data of twenty logical units could be swapped with twenty dummy logical units, and the administrator could halt the restore process in the middle and resume several days later. Advantageously, the hosts remain connected to the logical units. The identities of the original 20 logical units are preserved until the restore is resumed again. A restore is typically initiated from a backup snapshot, and as a part of the process, meta-data (identity) of the each logical unit is swapped with a newly created dummy logical unit. Following the completion of the swap, the original logical unit data can be over-written with logical unit data from a chosen backup. Host connectivity is unaffected as the host is pointed to a dummy logical unit during the process. In finalizing the restore, the identity of the restored logical unit is returned by swapping meta-data with the previously preserved meta-data. Once a restore completes successfully, dummy logical units are deleted. If there is a system failure before completion of the restore, logical unit identities can be recovered from their corresponding dummy logical units. Following the recovery from the system failure the restore can be restarted without the loss of connection to the hosts.

Advantageously, the various systems and methods implementing the techniques introduced here allow a host to maintain an existing session eliminating the need to offline and re-establish connections with a logical unit. Substantial time is saved and productivity increased through the elimination of the problems discussed above.

Software that implements the techniques discussed above can be, for example, application level software that executes on top of a conventional operating system. It can be a self-contained application or a component of a larger application, such as an application which provides various network storage management functions.

FIG. 1 depicts an example of a network storage system 100. FIG. 1 includes host 102, network 104, network storage controller 106, and mass storage devices 114. The mass storage devices 114 are coupled to the network storage controller 106. The Mass storage devices 114 are treated collectively by the network storage controller 106 as an aggregate 110 of storage. The aggregate 110 is defined to include, in this example, a volume 111 which includes logical unit 112-1, logical unit 112-2, and logical unit 112-*n* (collectively logical units 112). The network storage controller 106 is coupled to the hosts 102 by network 104 as defined below.

The host 102 is a processing system requiring data storage services. The host 102 can reside in one or more hardware units, and such units can be connected by one or more networks. To access storage, the host 102 enters into a session with the network storage controller 106 to access a logical unit. Such a session can be established by the use of software implementing iSCSI (internet/initiator Small Computer System Interface) protocol, for example.

The network 104 may be, for example, a local area network (LAN), wide area network (WAN), metropolitan area network (MAN), global area network such as the Internet, a Fibre Channel fabric, any combination of such networks, or any other known or convenient medium for communicating data. The network 104 can include one or more routers, switches and/or other networking hardware elements coupled together to provide communications to systems or within systems and devices coupled to the network 104.

The network storage controller 106 includes a storage operating system that includes a storage manager to logically organize data and to control storage access operations. The storage manager can implement a hierarchical structure of directories and files on one or more logical units. Data stored by a network storage controller 106 can be stored in basic units of data called blocks. Files can be defined from multiple blocks, as can larger units of storage, such as volumes.

The network storage controller 106 implements meta-data and functions associated with storage and retrieval of data on behalf of one or more hosts and can implement one or more network storage protocols, such as iSCSI, FCP (Fibre Channel Protocol), NFS (Network File System), SMB/CIFS (Server Message Block/Common Internet File System), hypertext transfer protocol (HTTP), transmission control protocol/internet protocol (TCP/IP), or any known or convenient protocol. The network storage controller 106 manages data in the mass storage devices 114. Each of the network storage controllers 106 typically includes internal memory, such as dynamic random access memory (DRAM), for buffering data to be read from and written to the mass storage system.

The aggregate 110 is a logical grouping of mass storage devices 114. The mass storage devices 114 can be organized into groups of drives, such as into one or more redundant array of independent disks (RAID) groups. At least a portion of the aggregate may be separately defined as logical volumes within the aggregate 110. In the example of FIG. 1, a volume is divided into logical units including the logical units 112.

The logical units 112 appear as virtual mass storage devices available for storage and retrieval of data. Each of the logical units 112 can include one or more files in which data is stored, as well as meta-data identifying the logical unit. In the example of FIG. 1, the logical unit 112-2 is a dummy logical unit, or a logical unit storing no data, but having meta-data allowing the logical unit 112-2 to be identified.

The non-volatile mass storage devices 114 can be, for example, hard disk drives, such as magnetic hard disks, optical disks, flash memory, or another form of storage for persistently storing large amounts of data.

Referring still to FIG. 1, in operation, the host 102 connects to the network storage controller 106 to enter into a session with logical unit 112-1 to store and retrieve data from logical unit 112-1. The session establishes a relationship between the host 102 and logical unit 112-1. The host then prepares to perform an action on logical unit 112-1, such as a restore, a data integrity check, a copy of the logical unit, or any other desired action. The network storage controller creates a dummy logical unit. In the example of FIG. 1, the dummy logical unit is logical unit 112-2. The network storage controller 106 then swaps the meta-data of logical unit 112-1 with the meta-data of logical unit 112-2. The host 102 can be unaware of the swap, that is, the swap is transparent to the host 102. The host 102 is left connected to logical unit 112-2 using the session previously established with logical unit 112-1. Advantageously, logical unit 112-1 is not taken offline and the host 102 need not be re-configured to use the logical unit 112-2.

In the example of FIG. 1, the network storage controller can swap the meta-data, e.g. logical unit serial number and logical unit maps of logical unit 112-1 with the meta-data of the logical unit 112-2 upon completion of the action to direct the host back to the logical unit 112-1, but some actions may not require the swap, for example, a move of a logical unit. For an action requiring the swap, the network storage controller 106 swaps the meta-data of the logical unit 112-1 with the meta-data of the logical unit 112-2, returning the host to the logical unit 112-1. The host need not be taken offline or reconfigured to resume using logical unit 112-1.

In the example of FIG. 1, the logical unit 112-1 can be deleted to effect a move of the original logical unit 112-1 to a new location. The deletion can effect a move of the original logical unit to a new volume, or other location.

In the example of FIG. 1, the logical unit 112-1 and the logical unit 112-2 can both be kept and the dummy used as a copy of the original logical unit. As such all user data is copied to the dummy, and instead of deleting either logical unit 112-1 or logical unit 112-2, a user desiring to make a copy of logical unit 112-1 could save both logical unit 112-1 and logical unit 112-2.

In the example of FIG. 1, the original logical unit can have a maintenance action performed on it such as a restore of data from a previous snapshot of the logical unit 112-1 or a data integrity check of the logical unit 112-1. Then the meta-data of logical unit 112-1 can be swapped again with the meta-data of logical unit 112-2 to re-connect the host 102 to the logical unit 112-1.

In the example of FIG. 1, read/write permissions are set in any conventional manner, taking into account the application required by the host 102. For example, I/O parameters can be set to disable read and/or write access to logical unit 112-2 to prevent the host 102 from storing data in logical unit 112-2 while the maintenance action is performed. However, it is also possible to create a clone of logical unit 112-1 as logical unit 112-2 to allow for read/write access. The dummy could be created as a clone by copying all user data to the dummy. Then the clone could be allowed read-only access to logical unit 112-2 where the host 102 must have continuous access to logical unit 112-2. Where a clone is used, full read and write access can be enabled as well, however, data saved to logical unit 112-2 would be inaccessible upon swapping the meta-data of logical unit 112-1 with logical unit 112-2.

Figure 2:
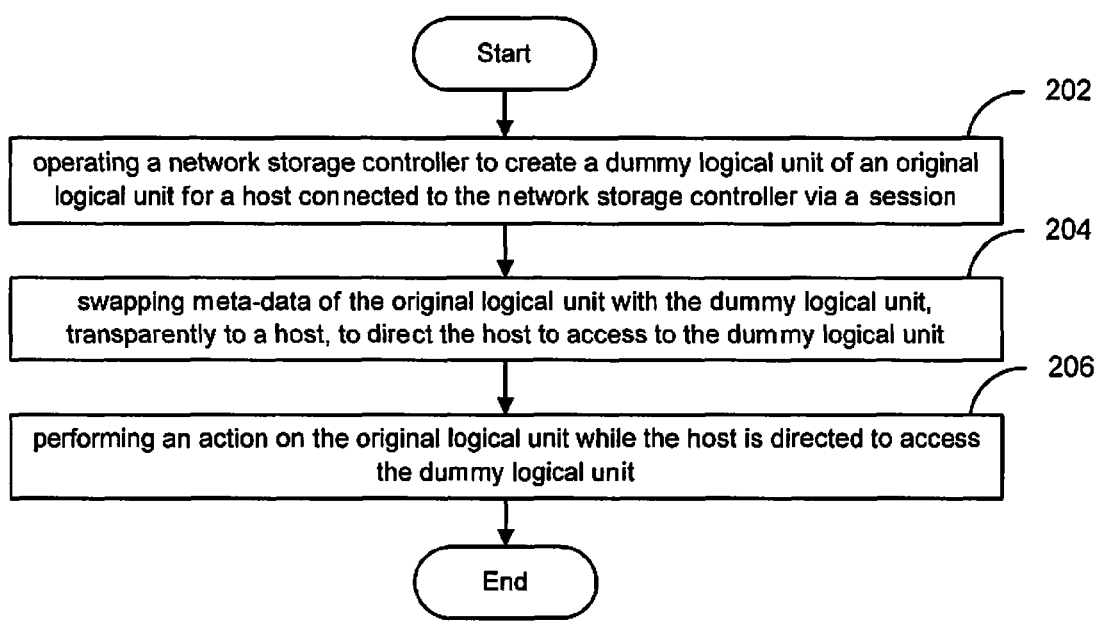
FIG. 2 is a flowchart of a process that may be performed by a network storage controller to redirect a host to a dummy logical unit from an original logical unit.

FIG. 2 is a flowchart of a process 200 that may be performed by a network storage controller to redirect a host to a dummy logical unit from an original logical unit. The process is organized as a sequence of operations in the flowchart 200. A user or automated routine triggers the process by indicating that a network storage controller should, e.g. perform a maintenance operation on a logical unit or a copy a logical unit.

In the example of FIG. 2, the process starts at 202 with the network storage controller creating a dummy logical unit of an original logical unit for a host connected to the network storage controller via a session. Copying all user data to the dummy can change the dummy into a copy of the original logical unit with different meta-data. The original logical unit is the target of the action to be performed. The dummy logical unit has different meta-data identifying the dummy logical unit separately from the original logical unit, such as a unique serial number and information regarding mapped hosts.

In the example of FIG. 2, the process continues to 204 with the network storage controller swapping meta-data of the original logical unit with the dummy logical unit, transparently to a host, to direct the host to access to the dummy logical unit. The swap can be transparent, that is to say, the host can be unaware of the swap. The swapping occurs by replacing the meta-data of the original logical unit with the meta-data of the dummy logical unit, and replacing the meta-data of the dummy logical unit with the meta-data of the original logical unit. By swapping the meta-data, a host directed to the original logical unit will be directed to access the dummy logical unit without re-configuring the host.

In the example of FIG. 2, the process continues to 206 with performing an action on the original logical unit while the host is directed to access the dummy logical unit. An action could be a copy, a move, a data integrity verification, a restore from a backup, or any desired action. Depending on the need for user data, a dummy or a clone can be used. For example, a copy or move operation requires user data and can use a clone of the logical unit whereas, for example, the data integrity verification and the restore can use a dummy or a clone. While the action is performed, the host accesses the dummy logical unit meaning the original logical unit is free and available to be worked on. Advantageously, the host does not loose connectivity with the network storage controller while the action is performed. Having performed an action on the original logical unit, the process terminates.

At times, such as when performing a maintenance action, it may be necessary to swap the meta-data of the logical units again to return a host to the original logical unit, however in other cases no such swap is necessary, such as where the action is already complete, e.g. a "move" operation.

Figure 3:
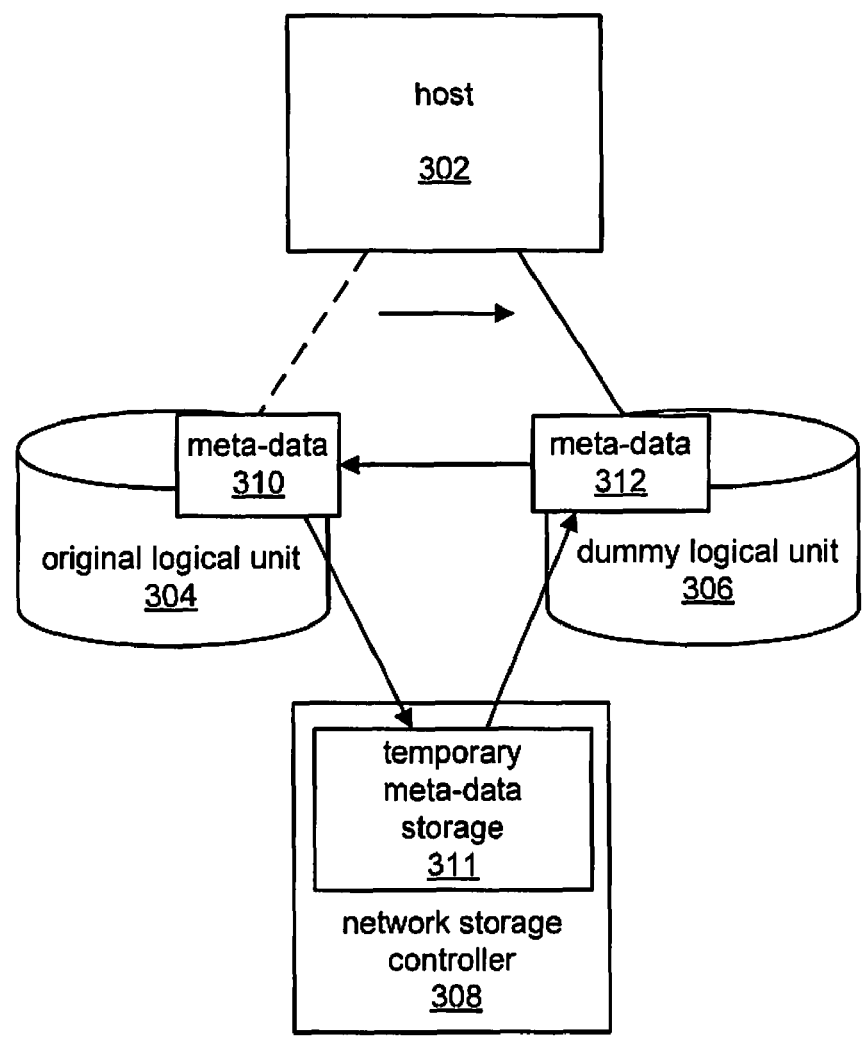
FIG. 3 is a diagram of a network storage controller re-directing a host system from an original logical unit to a dummy logical unit without disconnecting the host system.

FIG. 3 is a diagram of a network storage controller redirecting a host system from an original logical unit to a dummy logical unit without disconnecting the host system. Although FIG. 3 depicts the dummy, the dummy does not necessarily exist initially, but can be created as needed, e.g. when a maintenance action is required, or a copy of a logical unit is needed. FIG. 3 includes host 302, original logical unit 304, dummy logical unit 306 and network storage controller 308. The original logical unit 304 is identified by meta-data 310 and the dummy logical unit 306 is identified by meta-data 312. The network storage controller 308 includes temporary meta-data storage 311. In the example of FIG. 3, the host 302 and the network storage controller 308 are as defined above.

In the example of FIG. 3, the original logical unit 304 is a logical unit having meta-data 310 identifying the original logical unit to any device and including a data file. The dummy logical unit 306 is a logical unit including a copy of the data file from the original logical unit 304. However, meta-data 312 of the dummy logical unit 306 are different from the meta-data 310 of the original logical unit, as each logical unit is created with different meta-data so as to be distinctly identified.

In the example of FIG. 3, in operation, the network storage controller 308 performs a swap of the meta-data 310 with the meta-data 312. In accomplishing the swap, the network storage controller 308 stores meta-data 310 into temporary meta-data storage 311. The network storage controller 308 replaces meta-data 310 with meta-data 312. Then the network storage controller 308 replaces the meta-data 312 with the meta-data stored in the temporary meta-data storage 311.

Figure 4:
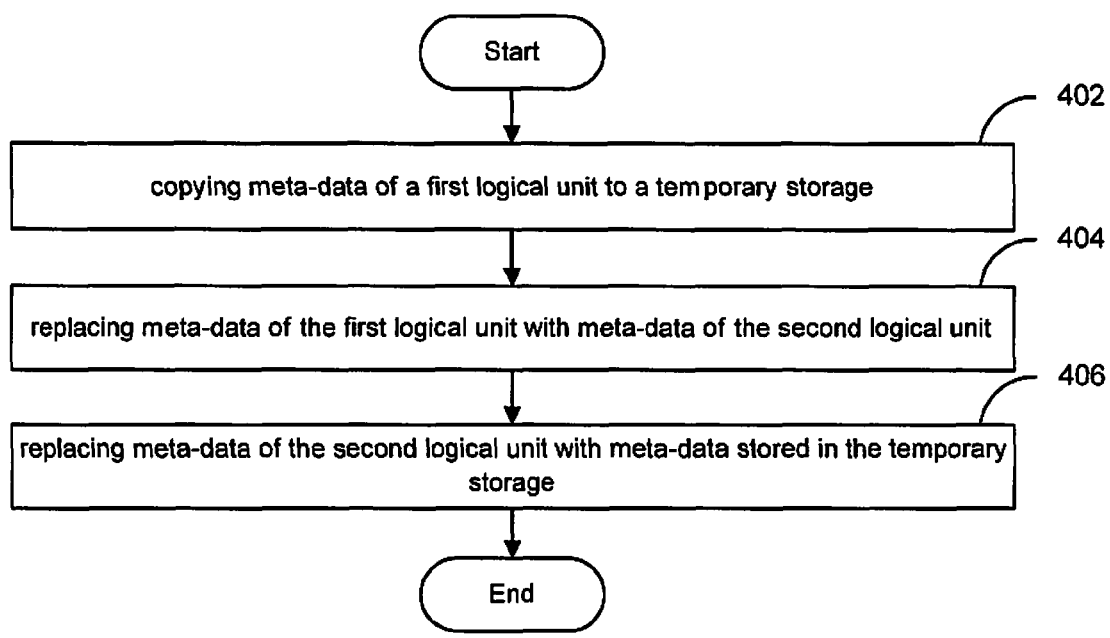
FIG. 4 depicts a flowchart of a process for operating a network storage controller to swap meta-data between a logical unit and a dummy logical unit.

FIG. 4 depicts a flowchart of a process 400 for operating a network storage controller to swap meta-data between a logical unit and a dummy logical unit. The process explained herein, is an example of a process that can be used to implement a swap of meta-data as discussed above. The process is organized as a sequence of operations in the flowchart 400. A user or automated routine triggers the process by indicating that a network storage controller should swap meta-data of two logical units.

In the example of FIG. 4, the process starts at 402 with copying the meta-data of a first logical unit to a temporary storage. The meta-data uniquely identify the first logical unit and are preserved in the temporary storage for future use.

In the example of FIG. 4, the process continues to 404 with replacing the meta-data of the first logical unit with the meta-data of the second logical unit. To a host, the first logical unit is no longer identified as the first logical unit, because it now has the meta-data of the second logical unit.

In the example of FIG. 4, the process continues to 406 with replacing the meta-data of the second logical unit with the meta-data stored in the temporary storage. The second logical unit now has the meta-data of the first logical unit, and therefore will be identified by a host as the first logical unit. Having replaced meta-data of the second logical unit with meta-data stored in the temporary storage, the process terminates. The same basic process can be used to swap the meta-data back.

Figure 5:
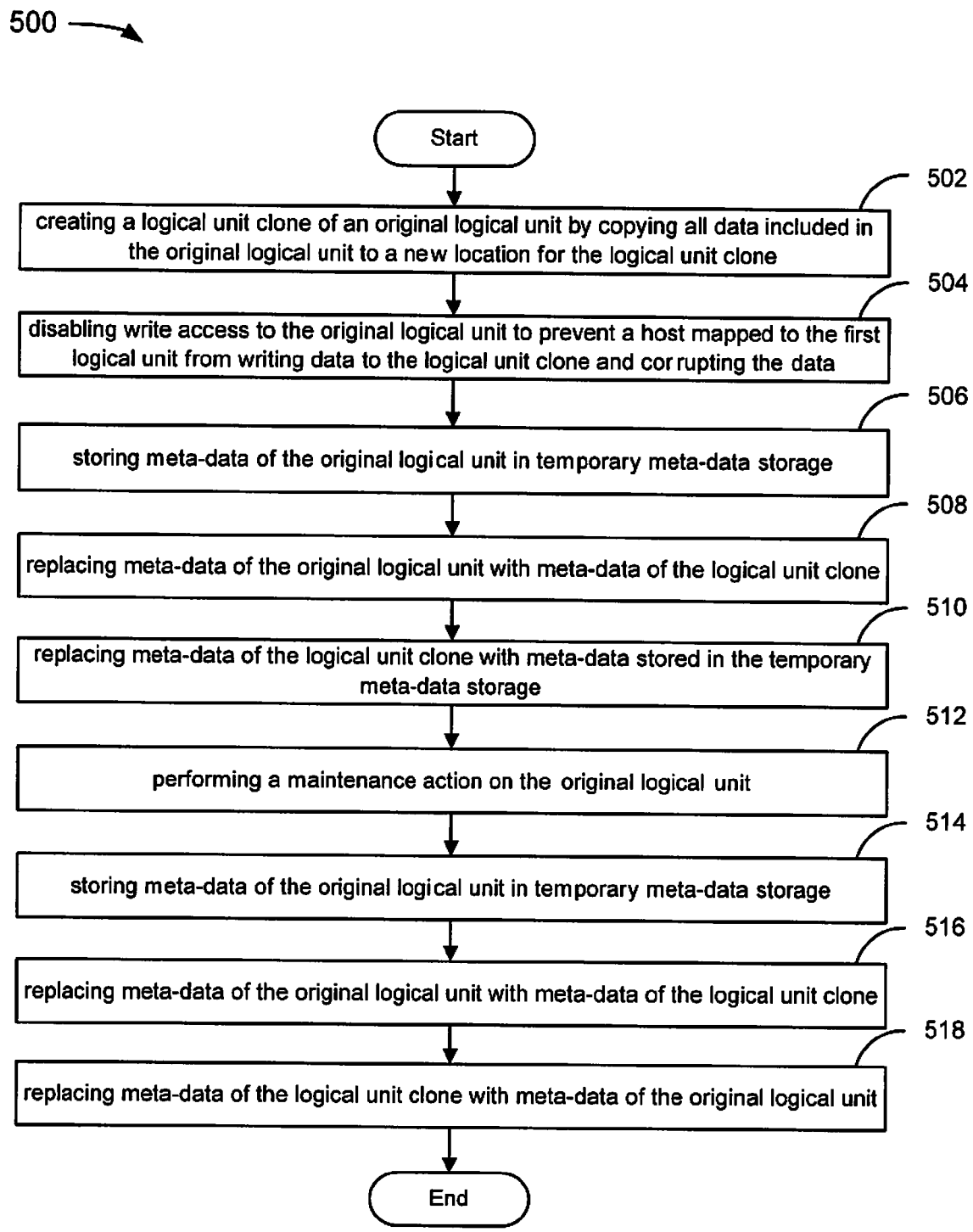
FIG. 5 is a flowchart of a process for performing a maintenance action without terminating a connection between a host and a logical unit.

FIG. 5 is a flowchart of a process for performing a maintenance action without terminating a connection between a host and a logical unit. The process is organized as a sequence of operations in the flowchart 500. The process explained herein can be used to perform a maintenance action on a logical unit as discussed above and includes operations included in processes discussed above, but includes various operations specific to performing a maintenance action that would not be performed when, e.g., moving a logical unit.

In the example of FIG. 5, the process starts at 502 with creating a logical unit clone of an original logical unit by copying all data included in the original logical unit to a new location for the logical unit clone. The clone includes meta-data different from the original logical unit, but the same data as the original logical unit. As compared with the dummy logical unit, which does not require a separate copy of the user data, the clone does have a separate copy of the user data. Either the clone or the dummy can be used to maintain a connection to a host, such as by swapping meta-data, however, the dummy typically is not accessible for reads or writes, and cannot be kept as a copy. The dummy is typically temporary whereas the clone may not be temporary.

In the example of FIG. 5, the process continues to 504 with disabling write access to the original logical unit to prevent a host mapped to the first logical unit from writing data to the logical unit clone and corrupting the data. Should a host write data to a logical unit clone while the original logical unit is receiving a maintenance action, the data written would be lost when the host is redirected to the original logical unit. At times, a host can be allowed to read data from the logical unit clone, or can even be allowed to write data so long as the host was instructed that the data would be lost when the logical unit clone was destroyed.

In the example of FIG. 5, the process continues to 506 with storing meta-data of the original logical unit in temporary meta-data storage. The meta-data of the original logical unit are preserved for future use.

In the example of FIG. 5, the process continues to 508 with replacing the original logical unit with meta-data of the logical unit clone. The meta-data of the logical unit clone can be copied and written over the meta-data of the original logical unit.

In the example of FIG. 5, the process continues to 510 with replacing meta-data of the logical unit clone with meta-data stored in the temporary meta-data storage. The meta-data stored in the temporary meta-data storage previously identified the original logical unit, and when written to the logical unit clone, the host will be directed to logical unit clone.

In the example of FIG. 5, the process continues to 512 with performing a maintenance action on the original logical unit. The maintenance action can be a restore of data, a data integrity check, or any known or convenient maintenance action.

In the example of FIG. 5, the process continues to 514 with storing meta-data of the original logical unit in temporary meta-data storage. The original logical unit currently holds meta-data held by the logical unit clone. The meta-data are preserved for future use.

In the example of FIG. 5, the process continues to 516 with replacing meta-data of the original logical unit with meta-data of the logical unit clone. The meta-data of the logical unit clone are the meta-data previously held by the original logical unit. The meta-data can be written over the meta-data held by the original logical unit.

In the example of FIG. 5, the process continues to 518 with replacing meta-data of the logical unit clone with meta-data of the original logical unit. The meta-data previously held by the logical unit clone are returned to the logical unit clone such as by writing them to the logical unit clone. Having replaced meta-data of the logical unit clone, the process terminates.

Figure 6:
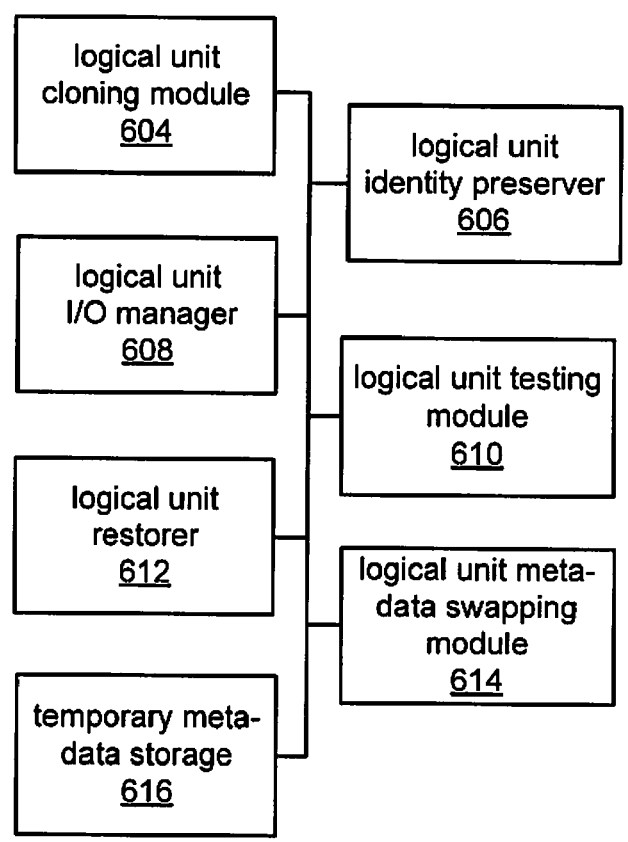
FIG. 6 is a high level block diagram of a network storage controller including various modules.

FIG. 6 is a high level block diagram of a network storage controller 600 including various modules. Network storage controller 600 includes logical unit cloning module 604, logical unit identity preserver 606, logical unit I/O manager 608, logical unit testing module 610, logical unit restorer 612, logical unit meta-data swapping module 614, and temporary meta-data storage 616. The modules depicted are but a subset of modules that can be included in a network storage controller. Other modules which are not germane to the techniques introduced here are not shown.

The network storage controller 600 is operable to manage one or more logical units using these modules. In particular, the logical unit cloning module 604 is operable to create a logical unit clone including a copy of data included in an original logical unit and to assign meta-data to the logical unit clone. The logical unit identity preserver 606 is operable to copy meta-data of a logical unit to temporary meta-data storage 616. The logical unit input/output (I/O) manager 608 is operable to set read/write permissions for a logical unit. The logical unit I/O manager 608 can place a logical unit in an unavailable state in an iSCSI target layer, disable read permission for a logical unit, and/or disable write permissions for a logical unit. The logical unit testing module 610 is operable to inspect the integrity of a logical unit and to repair the logical unit should damage be found. The logical unit restorer 612 is operable to replace blocks of data in a logical unit with blocks of data from a snapshot of the logical unit. The logical unit meta-data swapping module 614 is operable to replace meta-data of a first logical unit with meta-data of a second logical unit, and to replace meta-data of the second logical unit with meta-data of the first logical unit. The temporary meta-data storage 616 is a memory location within or accessible to the network storage controller, such as random access memory or non-volatile memory.

Figure 7:
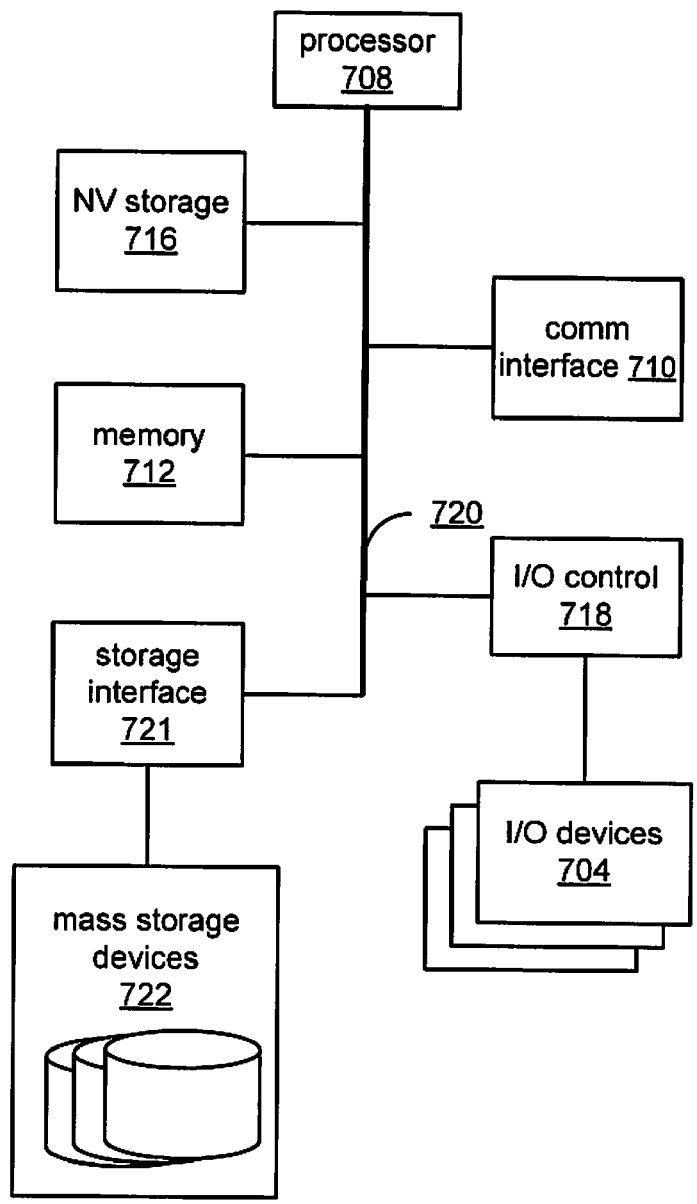
FIG. 7 is a high-level block diagram showing an example of the architecture of a processing system that can be representative of any of the processing systems discussed herein, such as a host or network storage controller.

FIG. 7 is a high-level block diagram showing an example of the architecture of a processing system 700 that can represent of any of the processing systems discussed herein, such as a host or network storage controller. The system 700 may be a conventional computing system that can be used as a client computing system, such as a personal computing system, hand held device, or a workstation, or a server-class computing system. The system 700 includes I/O devices 704, processor 708, storage interface 721, a communications interface 710, memory 712, non-volatile storage 716, I/O controller 718.

The communications interface 710 may include a modem or network interface. The communications interface 710 can be an ethernet adapter, a Fibre Channel (FC) adapter, an analog modem, ISDN modem or terminal adapter, cable modem, token ring IEEE 702.5 interface, Ethernet/IEEE 7 02.3 interface, wireless 702.11 interface, satellite transmission interface (e.g. "direct PC"), WiMAX/IEEE 702.16 interface, Bluetooth interface, cellular/mobile phone interface, third generation (3G) mobile phone interface, code division multiple access (CDMA) interface, Evolution-Data Optimized (EVDO) interface, general packet radio service (GPRS) interface, Enhanced GPRS (EDGE/EGPRS), High-Speed Downlink Packet Access (HSPDA) interface, or other interfaces for coupling a computer system to other computer systems.

The processor 708 may be, for example, a conventional microprocessor such as an Intel Pentium microprocessor or Motorola power PC microprocessor. The memory 712 is coupled to the processor 708 by a bus 720. The memory 712 can be Dynamic Random Access Memory (DRAM) and can also include Static RAM (SRAM). The bus 720 couples the processor 707 to the memory 712, also to the non-volatile storage 716, to the display controller 714, and to the I/O controller 718.

The I/O devices 704 can include a keyboard, disk drives, printers, a scanner, and other input and output devices, including a mouse or other pointing device.

The non-volatile storage 716 can be or include a magnetic hard disk, flash memory, an optical disk, or another form of persistent storage for large amounts of data. Some of this data is often written, by a direct memory access process, into memory 712 during execution of software. One of skill in the art will immediately recognize that the terms "machine-readable medium" or "computer-readable medium" includes any type of storage device that is accessible by the processor 708.

The storage interface 721 includes input/output (I/O) interface circuitry that couples the storage interface 721 to one or more mass storage devices disks over an I/O interconnect arrangement, such as a conventional high-performance, FC (Fibre Channel) serial link topology. Information may be stored on any type of attached array of writable storage device media such as video tape, optical, DVD, magnetic tape, bubble memory, electronic random access memory, micro-electro mechanical and any other similar media adapted to store information, including data and parity information. The mass storage devices 722 are often magnetic hard disks, optical disks, or another form of storage for large amounts of data.

The system 700 is one example of many possible computing systems which have different architectures. For example, personal computers (PCs) based on an Intel microprocessor often have multiple buses, one of which can be an I/O bus for the peripherals and one that directly connects the processor 708 and the memory 712 (often referred to as a memory bus). The buses are connected together through bridge components that perform any necessary translation due to differing bus protocols.

Network computing devices are another type of computing system that can be used in conjunction with the teachings provided herein. Network computing devices do not usually include a hard disk or other mass storage, and the executable programs are loaded from a network connection into the memory 712 for execution by the processor 708. A typical computing system will usually include at least a processor, memory, and a bus coupling the memory to the processor.

In addition, the system 700 is controlled by operating system software which includes a file management system, such as a disk operating system, which is part of the operating system software. One example of operating system software with its associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage 716 and causes the processor 708 to execute the various acts required by the operating system to input and output data and to store data in memory, including storing files on the non-volatile storage 716.

Figure 8:
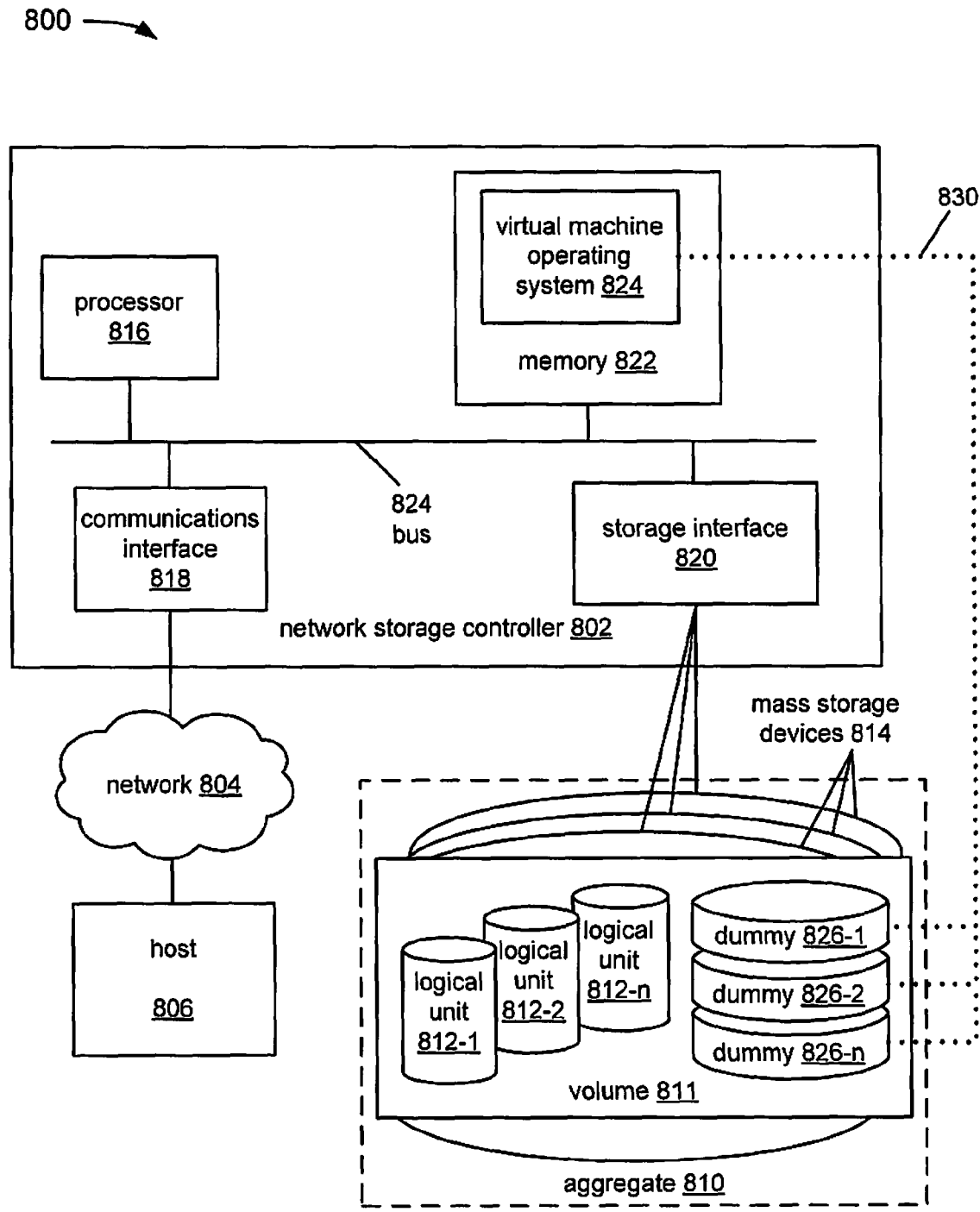
FIG. 8 is a diagram of a network storage controller including a virtual operating system coupled to dummy logical units that can be swapped with logical units as needed.

FIG. 8 is a diagram of a network storage controller including a virtual machine operating system operatively coupled to dummy logical units that can be swapped with logical units as needed. FIG. 8 includes a network storage controller 802, network 804, host 806, aggregate 810, and mass storage devices 814. The network storage controller 802, the network 804, the host 806, the aggregate 810, and the mass storage device 814 can each be as discussed in reference to FIG. 1.

In the example of FIG. 8, the aggregate logically includes volume 811, and volume 811 logically includes logical unit 812-1, logical unit 812-2, and logical unit 812-n (collectively logical units 812). The logical units 812, the aggregate 810, and the volume 811 can each be as discussed in reference to FIG. 1

In the example of FIG. 8, the network storage controller 802 includes processor 816, communications interface 818, storage interface 820, and memory 822, which can all be coupled by bus 802. The network storage controller 802, the processor 816, the communications interface 818, the storage interface 820, memory 822, and bus 802 can be as is discussed in reference to FIG. 7.

In the example of FIG. 8, the memory 822 includes virtual machine operating system 824, dummy logical unit ("dummy") 826-1, dummy 826-2, and dummy 826-n (collectively dummies 826). The dummies 826 can be dummy logical units as discussed above. The virtual machine operating system 824 can be a virtual machine operating system such as one available from any provider of virtual operating systems, such as for example, VMware of Mountain View, Calif. The virtual machine operating system 824 can allow a file system to logically organize information as a hierarchical structure of named data containers, such as blocks on the disks that are exported as named logical units. The storage operating system is preferably the NetApp Data ONTAP® operating system available from NetApp, Inc., Sunnyvale, Calif. that implements a Write Anywhere File Layout (WAFL) file system. However, any appropriate storage operating system may be enhanced for use in accordance with the techniques described herein.

In the example of FIG. 8, in operation, the virtual machine operating system 824 is executed to "startup" the virtual machine operating system 824 and to connect the virtual machine operating system 824 to the dummies 826, as shown by relationship indicator 830. After starting the virtual machine operating system 824 a user or automated process decides to connect the virtual machine operating system 824 to the logical unit 812-1. As the virtual machine operating system 824 is already connected to dummy 826-1, the network storage controller 802 can swap meta-data of the dummy 826-1 with the meta-data of the logical unit 812-1 to substitute the logical unit 812-1 for the dummy 826-1. The virtual operating system 824 is then connected to the logical unit 812-1. Similarly, dummy 826-2 through dummy 826-n can each also have meta-data swapped with meta data of logical unit 812-2 through logical unit 812-n to allow the virtual operating system 824 to access data stored in logical unit 812-1 through 812-n.

What is claimed is:

1. A method comprising:
   operating a network storage controller to create a dummy logical unit of an original logical unit, the dummy logical unit having different meta-data from the original logical unit distinguishing the dummy logical unit from the original logical unit, wherein the dummy logical unit serves as a placeholder and contains no user data;
   substituting the dummy logical unit for the original logical unit by swapping meta-data of the original logical unit with meta-data of the dummy logical unit, transparently to a host, to maintain a connection between the network storage controller and the host while re-directing the host to the dummy logical unit; and
   performing an action on the original logical unit while the host is connected to the dummy logical unit.

2. The method of claim 1, wherein the action is a restore of data to the original logical unit.

3. The method of claim 1, wherein the action verifies data integrity of the original logical unit.

4. The method of claim 1, further comprising:
   swapping meta-data of the dummy logical unit with the original logical unit to re-connect the host with the original logical unit.

5. The method of claim 4, further comprising:
   deleting the dummy logical unit after the host has been re-directed back to the original logical unit.

6. The method of claim 1, wherein the host executes as a virtualized operating system in a virtual execution environment and the host is able to enter into a new connection with a logical unit only at startup within the virtual execution environment, the method further comprising:
   operating the host at startup to connect the host to a plurality of dummy logical units at the network storage controller; and
   wherein at least one of the plurality of dummy logical units is swapped with at least one original logical unit to connect the host to the original logical unit while the virtualized operating is executing after having completed startup.

7. A method comprising:
   in a network storage controller, disabling read and write access to a first logical unit from a host to prevent the host from altering data stored in the first logical unit;
   preserving the identity of the first logical unit by swapping meta-data of the first logical unit with meta-data of a second logical unit to maintain a connection between the host and a network storage controller while performing a restore operation on the first logical unit, wherein the second logical unit is a dummy logical unit and contains no user data;
   restoring data to the first logical unit from a snapshot of the first logical unit taken at a previous time; and
   restoring the identity of the logical unit by swapping the meta-data of the first logical unit with the meta-data of the second logical unit.

8. The method of claim 7 further comprising deleting the second logical unit to free memory following the restore of data to the first logical unit.

9. The method of claim 7 wherein an error prevents the restore operation from completing while the host is directed to the second logical unit; further comprising recovering from the error by resuming the restore operation while the host remains connected to the second logical unit.

10. A method comprising:
    instructing a virtualized operating system in a virtual execution environment to enter into a plurality of connections at startup with dummy logical units wherein the virtualized operating system can enter into new connections with logical units only at startup of the virtualized operating system, wherein the dummy logical units serve as placeholders and contain no user data; and
    substituting a logical unit for a dummy by swapping meta-data of the logical unit with meta-data of the dummy, transparently to the virtualized operating system, to allow the virtualized operating system to access the logical unit.

11. The method of claim 10 further comprising substituting a second logical unit for a second dummy by swapping meta-data of the dummy with meta-data of the second logical unit to allow the virtualized operating system to access data in the second logical unit.

* * * * *